US012700587B2

(12) United States Patent
Kim et al.

(10) Patent No.: US 12,700,587 B2
(45) Date of Patent: Aug. 4, 2026

(54) CATHODE ACTIVE MATERIAL FOR LITHIUM SECONDARY BATTERY AND LITHIUM SECONDARY BATTERY INCLUDING THE SAME

(71) Applicants: SK ON CO., LTD., Seoul (KR); SK INNOVATION CO., LTD., Seoul (KR)

(72) Inventors: Sang Bok Kim, Daejeon (KR); Sang Min Park, Daejeon (KR); Ji Hoon Choi, Daejeon (KR); Jung Moon Sung, Daejeon (KR); Sang Hye Shin, Daejeon (KR); Ji Sun Lee, Daejeon (KR); Jae Young Choi, Daejeon (KR)

(73) Assignee: SK On Co., Ltd., Seoul (KR)

( * ) Notice: Subject to any disclaimer, the term of this patent is extended or adjusted under 35 U.S.C. 154(b) by 792 days.

(21) Appl. No.: 17/970,271

(22) Filed: Oct. 20, 2022

(65) Prior Publication Data

US 2023/0117843 A1 Apr. 20, 2023

(30) Foreign Application Priority Data

Oct. 20, 2021 (KR) ........................ 10-2021-0140119

(51) Int. Cl.
*H01M 4/485* (2010.01)
*H01M 4/04* (2006.01)
(Continued)

(52) U.S. Cl.
CPC ......... *H01M 4/485* (2013.01); *H01M 4/0471* (2013.01); *H01M 4/366* (2013.01); (Continued)

(58) Field of Classification Search
None
See application file for complete search history.

(56) References Cited

U.S. PATENT DOCUMENTS

| | | | |
|---|---|---|---|
| 2006/0068289 A1 | 3/2006 | Paulsen et al. | |
| 2020/0144612 A1* | 5/2020 | Kim ..................... | C07D 277/36 |
| 2022/0052334 A1* | 2/2022 | Fukamichi ............. | C01G 51/82 |

FOREIGN PATENT DOCUMENTS

| | | |
|---|---|---|
| KR | 10-0821523 B1 | 4/2008 |
| KR | 1020100013673 A | 2/2010 |

(Continued)

OTHER PUBLICATIONS

Notice of Allowance for Korean Patent Application No. 10-2021-0140119 issued by the Korean Patent Office on Jan. 15, 2025.

(Continued)

*Primary Examiner* — Wyatt P Mcconnell
(74) *Attorney, Agent, or Firm* — IP & T GROUP LLP

(57) ABSTRACT

Embodiments of the present invention provide a cathode active material for a lithium secondary battery. The cathode active material for a lithium secondary battery includes lithium-transition metal composite oxide particles, and a coating formed on each of the lithium-transition metal composite oxide particles. The coating includes a lithium-sulfur compound and a metal hydroxide. A residual lithium on a surface of the cathode active material is sufficiently removed to improve an ionic conductivity and low-resistance.

14 Claims, 4 Drawing Sheets

(51) Int. Cl.
  *H01M 4/36*          (2006.01)
  *H01M 4/58*          (2010.01)
  *H01M 10/052*        (2010.01)
  *H01M 4/02*          (2006.01)

(52) U.S. Cl.
  CPC ....... *H01M 4/5825* (2013.01); *H01M 10/052* (2013.01); *H01M 2004/021* (2013.01); *H01M 2004/028* (2013.01)

(56)                    References Cited

FOREIGN PATENT DOCUMENTS

| | | | |
|---|---|---|---|
| KR | 10-2016-0038294 | A | 4/2016 |
| KR | 1020160094894 | A | 8/2016 |
| KR | 10-2020-0056235 | A | 5/2020 |
| KR | 10-2020-0123488 | A | 10/2020 |
| KR | 10-2021-0039518 | A | 4/2021 |
| WO | 2020/086310 | A1 | 4/2020 |

OTHER PUBLICATIONS

Extended European Search Report for the European Patent Application No. 22202624.7 issued by the European Patent Office on Feb. 14, 2023.
Office Action for Korean Patent Application No. 10-2021-0140119 issued by the Korean Intellectual Property Office on Aug. 13, 2024.

\* cited by examiner

MIXING LITHIUM-TRANSITION METAL COMPOSITE OXIDE PARTICLES AND A METAL OXIDE TO FORM A PRE-COATING ⟶ S10

MIXING AN AQUEOUS SOLUTION OF A SULFONYL-BASED COMPOUND WITH THE LITHIUM-TRANSITION METAL COMPOSITE OXIDE PARTICLES TO FORM A MIXTURE ⟶ S20

CALCINATING THE MIXTURE TO FORM A COATING ON A SURFACE OF THE LITHIUM-TRANSITION METAL COMPOSITE OXIDE PARTICLES ⟶ S30

CATHODE ACTIVE MATERIAL FOR LITHIUM SECONDARY BATTERY AND LITHIUM SECONDARY BATTERY INCLUDING THE SAME

CROSS-REFERENCE TO RELATED APPLICATION

This application claims priority to Korean Patent Application No. 10-2021-0140119 filed on Oct. 20, 2021 in the Korean Intellectual Property Office (KIPO), the entire disclosure of which is incorporated by reference herein.

BACKGROUND

1. Field

The present invention relates to a cathode active material for a lithium secondary battery and a lithium secondary battery including the same. More particularly, the present invention relates to a lithium metal oxide-based cathode active material for a lithium secondary battery and a lithium secondary battery including the same.

2. Description of the Related Art

A secondary battery which can be charged and discharged repeatedly has been widely employed as a power source of a mobile electronic device such as a camcorder, a mobile phone, a laptop computer, etc., according to developments of information and display technologies. Recently, a battery pack including the secondary battery is being developed and applied as an eco-friendly power source such as an electric automobile The secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, the lithium secondary battery may include an electrode assembly including a cathode, an anode and a separation layer (separator), and an electrolyte immersing the electrode assembly. The lithium secondary battery may further include an outer case having, e.g., a pouch shape.

A lithium-transition metal composite oxide may be used as a cathode active material of the lithium secondary battery. For example, the lithium-transition metal composite oxide may include a nickel-based lithium metal oxide.

As an application range of the lithium secondary batteries is expanded, longer life-span, high capacity and operational stability are required. When non-uniformity in a chemical structure is caused due to a lithium precipitation in the lithium-transition metal composite oxide used as the cathode active material, a lithium secondary battery having desired capacity and life-span may not be achieved. Additionally, when the lithium-transition metal composite oxide structure is deformed or damaged during repeated charging and discharging, properties of life-span stability and capacity retention may be deteriorated.

SUMMARY

According to an aspect of the present invention, there is provided a cathode active material for a lithium secondary battery having improved stability and electrochemical properties and a method of preparing the same.

According to an aspect of the present invention, there is provided a lithium secondary battery having improved stability and electrochemical properties.

A cathode active material for a lithium secondary battery includes lithium-transition metal composite oxide particles, and a coating formed on each of the lithium-transition metal composite oxide particles. The coating includes a lithium-sulfur compound and a metal hydroxide.

In some embodiments, a binding energy measured through an X-ray Photoelectron Spectroscopy (XPS) of the metal hydroxide is greater than a binding energy measured through the XPS of an oxide of the metal included in the metal hydroxide by at least 0.4 V.

In some embodiments, a content of the metal hydroxide may be in a range from 0.1 mol % to 0.5 mol % based on a total number of moles of the lithium-transition metal composite oxide particles.

In some embodiments, the metal hydroxide may include at least one selected from the group consisting of LiOH, $Al(OH)_3$, $Ti(OH)_2$, $Zr(OH)_2$, $Sr(OH)_2$, $Ba(OH)_2$, $W(OH)_6$, $Mg(OH)_2$, $Ta(OH)_5$ and $Nb(OH)_5$.

In some embodiments, the lithium-transition metal composite oxide particle may each include a plurality of primary particles therein, and the lithium-sulfur compound may be present on an outer surface of the lithium-transition metal composite oxide particle and between the primary particles.

In some embodiments, an amount of the metal hydroxide present on the outer surface of the lithium-transition metal composite oxide particles may be greater than an amount of the metal hydroxide present between the primary particles.

In some embodiments, a sulfur content in the cathode active material measured through a CS (Carbon-Sulfur) analyzer may be in a range from 1,500 ppm to 4,500 ppm based on a total weight of the cathode active material.

In some embodiments, the lithium-sulfur compound may have a monoclinic crystal structure.

In a method for manufacturing a cathode active material for a lithium secondary battery, lithium-transition metal composite oxide particles and a metal oxide are mixed to form a pre-coating on a surface of each of the lithium-transition metal composite oxide particles. The lithium-transition metal composite oxide particles having the pre-coating thereon and an aqueous solution of a sulfur-containing compound are mixed to form a mixture. A calcination of the mixture is performed to form a coating that includes a lithium-sulfur compound and a metal hydroxide on the surface of the lithium-transition metal composite oxide particles.

In some embodiments, the pre-coating may be formed by dry-mixing of the lithium-transition metal composite oxide particles and the metal oxide.

In some embodiments, the metal oxide may include at least one selected from the group consisting of $Al_2O_3$, $TiO_2$, $Ti_2O_3$, $ZrO_2$, $B_2O_3$, $SrO_2$, $SrAl_2O_4$, $SrTiO_3$, $SrWO_4$, $BaO$, $WO_3$, $(NH_4)_{10}H_2(W_2O_7)_6$, $MgO$, $Ta_2O_5$, $Nb_2O_5$, $MoO_3$, $H_4[W_{12}SiO_{40}]$, $H_4SiO_4.12MoO_3$ and $(NH_4)_2MoO_4$.

In some embodiments, the sulfur-containing compound includes a sulfonyl-based compound, and a weight of a solvent in the aqueous solution is in a range from 2 wt % to 20 wt % based on a total weight of the lithium-transition metal composite oxide particles.

In some embodiments, the sulfur-containing compound may include at least one selected from the group consisting of $(NH_4)_2SO_4$, $SO_3NH_3$, $NH_4SO_3NH_2$, $Al_2(SO_4)_3$, $AlK(SO_4)_2$, $AlNH_4(SO_4)_2$, $Ti(SO_4)_2$, $TiOSO_4$, $SrSO_4$, $KHSO_4$, $NaHSO_4$ and $KHSO_4$.

In some embodiments, the calcination may be performed at a temperature in a range from 250° C. to 550° C.

In some embodiments, the lithium-transition metal composite oxide particles may be mixed with the aqueous solution without a water-washing treatment.

A lithium secondary battery according to embodiments of the present invention includes a cathode and an anode facing the cathode. The cathode includes a cathode active material layer including the cathode active material for a lithium secondary battery according to the above-described embodiments.

The cathode active material according to embodiments of the present invention includes a lithium-transition metal composite oxide particle and a coating formed on a surface of the lithium-transition metal composite oxide particle. The coating may include a lithium-sulfur compound and a metal hydroxide.

In this case, a residual lithium in the lithium-transition metal composite oxide particles may be reduced, and life-span properties of a lithium secondary battery may be improved from the metal hydroxide having a high binding energy. Further, the metal hydroxide may have an enhanced ion conductivity, so that a voltage drop in an initial stage of discharging may be suppressed.

In a method for manufacturing a cathode active material according to embodiments of the present invention, a lithium-transition metal composite oxide may be dry-coated with a metal oxide, and then an aqueous solution of a sulfur-containing compound may be mixed to perform an initial wetting method. In this case, water may not contact with a surface of the lithium-transition metal composite oxide particle. Accordingly, surface deterioration of the lithium-transition metal composite oxide particles may be prevented to improve the life-span properties.

Additionally, primary particles of the lithium-transition metal composite oxide particles may be prevented from being transformed from a hexagonal dense structure to a face-centered cubic structure during a washing treatment. Accordingly, deterioration of an initial capacity and the life-span properties of the secondary battery may be prevented. Further, the residual lithium on the surface of the lithium-transition metal composite oxide particles may be removed to reduce a gas generation, and a battery resistance may be reduced to improve the initial capacity.

DETAILED DESCRIPTION OF THE EMBODIMENTS

According to embodiments of the present invention, a cathode active material including lithium-transition metal composite oxide particles is provided. Further, a lithium secondary battery including the cathode active material is also provided.

Hereinafter, embodiments of the present invention will be described in detail with reference to specific experimental examples and the accompanying drawings. However, those skilled in the art will appreciate that such embodiments are provided to further understand the spirit of the present invention and do not limit subject matters to be protected as disclosed in the detailed description and appended claims.

Figure 1:
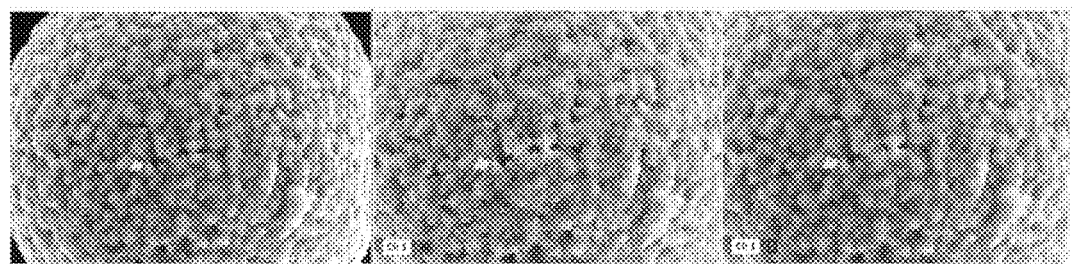
FIG. 1 is an SEM (Scanning Electron Microscopy) image showing a surface of a cathode active material in accordance with exemplary embodiments.

FIG. 1 is an SEM (Scanning Electron Microscopy) image showing a surface of a cathode active material in accordance with exemplary embodiments.

Referring to FIG. 1, the cathode active material includes a lithium-transition metal composite oxide particle and a coating formed on a surface of the lithium-transition metal composite oxide particle. The coating includes a lithium-sulfur (Li—S) compound and a metal hydroxide.

For example, the lithium-sulfur compound and the metal hydroxide may be included together in the coating layer.

In exemplary embodiments, the lithium-transition metal composite oxide particle may have a single crystal structure or a polycrystalline structure in a crystallographic aspect.

For example, the lithium-transition metal composite oxide particle may include nickel (Ni), and may further include at least one of cobalt (Co) and manganese (Mn).

For example, the lithium-transition metal composite oxide particle may be represented by Chemical Formula 1 below.

$$Li_aNi_xM_{1-x}O_{2+y} \qquad \text{[Chemical Formula 1]}$$

In Chemical Formula 1, $0.9 \leq a \leq 1.2$, $0.5 \leq x \leq 0.99$, and $-0.1 \leq y \leq 0.1$. M may include at least one element selected from Na, Mg, Ca, Y, Ti, Hf, V, Nb, Ta, Cr, Mo, W, Mn, Co, Fe, Cu, Ag, Zn, B, Al, Ga, C, Si, Sn, Ba and Zr.

In some preferable embodiments, a molar ratio or a concentration x of Ni in Chemical Formula 1 may be 0.8 or more, more preferably greater than 0.8.

For example, if a high-Ni composition in which x is 0.8 or more is employed, a calcination of the lithium-transition metal composite oxide particle may be performed at a relatively low temperature. Accordingly, an amount of a residual lithium produced on the surface of the lithium-transition metal composite oxide particle may be increased. Thus, a water washing process or a non-water washing process (e.g., an initial wetting method) for removing the residual lithium may be performed. As described above, for example, when x is 0.8 or greater, for example, a process for removing the residual lithium may be substantially effective.

Ni may be provided as a transition metal related to power and capacity of the lithium secondary battery. Therefore, as described above, the high-Ni composition may be introduced to the lithium-transition metal composite oxide particle, so that high-power cathode and lithium secondary battery may be provided.

However, as a content of Ni becomes greater, long-term storage stability and life-span stability of the cathode or the secondary battery at relatively high temperature may be deteriorated. However, according to exemplary embodiments, life-span stability and capacity retention may be improved by using Mn while maintaining an electrical conductivity by including Co.

In some embodiments, the lithium-transition metal composite oxide particle may include a plurality of primary particles.

For example, the primary particles may have a hexagonal close-packed structure. Accordingly, a large amount of lithium and transition metal elements may be included in a stable layered structure even in a small space, so that capacity and life-span properties of the secondary battery may be improved.

In some embodiments, the lithium-sulfur compound may have a monoclinic structure.

For example, the lithium-sulfur compound having a monoclinic structure may be obtained by reacting lithium hydroxide (LiOH) or lithium carbonate ($Li_2CO_3$) remaining on the surface of the lithium-transition metal composite oxide particle with an aqueous solution of a sulfur-containing compound. Accordingly, the residual lithium may be converted into a structurally stable lithium-sulfur compound to be present around the primary particles. Thus, initial capacity and battery efficiency may be enhanced, and deterioration of life-span properties caused by the residual lithium may be prevented.

For example, the crystal structure of the lithium-sulfur compound may be confirmed through a transmission electron microscope-selected area electron diffraction (TEM-SAED) analysis.

For example, the lithium-sulfur compound may include at least one selected from the group consisting of lithium sulfate ($Li_2SO_4$), lithium sulfate monohydrate ($Li_2SO_4 \cdot H_2O$), lithium ammonium sulfate ($Li(NH_4)SO_4$), lithium hydroxylammonium sulfate ($Li(NH_3)(OH)SO_4$), lithium fluorosulfate ($LiSO_3F$), lithium hydrogen sulfate ($LiHSO_4$) and lithium sulfide ($Li_2S$)

For example, the above-described lithium-sulfur compound has a relatively high resistance, and thus a voltage drop (IR-drop) may occur at an initial stage of discharging of the lithium secondary battery. In this case, a lithium mobility may be lowered, and an initial capacity may also be lowered in the same current condition.

Further, for example, a small amount of water may be added in the formation of the lithium-sulfur compound. In this case, the surface of the lithium-transition metal composite oxide particles may react with water to deform the crystal structure. Accordingly, the life-span characteristics of the battery may be deteriorated.

According to embodiments of the present invention, a coating including a metal hydroxide is formed on the surface of the lithium-transition metal composite oxide particle.

For example, the coating may be formed by performing a dry coating of a metal oxide in advance, and then adding an aqueous solution of a sulfur-containing compound. Accordingly, contact between the lithium-transition metal composite oxide particles and water may be blocked. Therefore, the life-span properties may be enhanced by suppressing the surface deterioration of the cathode active material.

For example, the metal hydroxide may be derived from the metal oxide, and may have a large amount of interstitial sites compared to that of an oxide of the same metal. Accordingly, the metal hydroxide may have enhanced ion conductivity compared to that from the oxide of the same metal, thereby suppressing the voltage drop in the initial stage of discharge.

In some embodiments, a binding energy (b.e.) measured by an X-ray photoelectron spectroscopy (XPS) of the metal hydroxide included in the coating may be greater than that measured from the XPS of the oxide of the same metal by at least 0.4 eV. In this case, the metal hydroxide may have more stable structure than that of the oxide of the same metal. Accordingly, the life-span properties during charging and discharging of the secondary battery may be improved, and an operational stability may be improved.

For example, the oxide of the metal may be provided as a raw material of the metal hydroxide. In this case, the metal oxide may be converted into the metal hydroxide having a higher binding energy by 0.4 eV or more according to the addition of the sulfur-containing compound. Accordingly, the life-span and storage properties of the secondary battery may be improved.

In some embodiments, a content of the metal hydroxide included in the coating may be in a range from 0.1 mol % to 0.5 mol % based on a total number of moles of the lithium-transition metal composite oxide particle. In this case, degradation of an initial capacity due to an excessive metal hydroxide content may be prevented while improving battery life-span properties and sufficiently suppressing the voltage drop. Accordingly, both capacity and life-span properties of the battery may be improved.

In some embodiments, the above-described metal hydroxide may include at least one selected from the group consisting of LiOH, $Al(OH)_3$, $Ti(OH)_2$, $Zr(OH)_2$, $Sr(OH)_2$, $Ba(OH)_2$, $W(OH)_6$, $Mg(OH)_2$, $Ta(OH)_5$, and $Nb(OH)_5$. Accordingly, sufficient lifetime properties and capacity properties improvement can be realized.

In some embodiments, a sulfur content in the cathode active material measured through a CS analyzer (Carbon-Sulfur analyzer) may be in a range from 1,500 ppm to 4,500 ppm based on a total weight of the cathode active material. In the above range, the residual lithium may be sufficiently removed to improve the battery life-span properties, and the voltage drop due to an excessively high sulfur concentration may be avoided.

In some embodiments, an amount of lithium impurities remaining on the surface of the lithium-transition metal composite oxide particles may be controlled.

For example, the content of lithium carbonate ($Li_2CO_3$) remaining on the surface of the lithium-transition metal composite oxide particles may be 3,000 ppm or less. In the above range, a resistance when lithium ions are transferred may be reduced, so that the initial capacity and power properties of the lithium secondary battery may be improved, and the life-span properties during repeated charging and discharging may be improved.

In some embodiments, the lithium-sulfur compound may be present on an outer surface of the lithium-transition metal composite oxide particle and between the primary particles.

For example, an aqueous solution of the sulfur-containing compound may penetrate between the primary particles by a capillary force. In this case, the sulfur-containing compound may react with the residual lithium between the primary particles, and a lithium-sulfur compound may be formed between the primary particles by a subsequent heat treatment. Accordingly, the lithium-sulfur compound may be entirely distributed on the surface of the secondary particle, and may also be present at a region between the primary particles. Thus, the region between the primary particles may be sufficiently protected during an impregnation with the electrolyte.

In some embodiments, when the initial wetting method is applied, the lithium-sulfur compound may be formed on the outer surface (a secondary particle surface) of the lithium-transition metal composite oxide particles and between the primary particles compared to when a simple water washing treatment or dry-coating is performed. Accordingly, the residual lithium between the primary particles which may not easily removed by the simple water washing treatment or dry-coating may be sufficiently removed.

In some embodiments, an amount of the metal hydroxide present on the outer surface (the secondary particle surface) of the lithium-transition metal composite oxide particle may be greater than an amount of the metal hydroxide present between the primary particles. Accordingly, ionic conductivity and life-span properties on the surface of the lithium-transition metal composite oxide particles may be improved.

Further, for example, the residual lithium present between the primary particles may be converted into the lithium-sulfur compound having a monoclinic crystal structure. The lithium-sulfur compound may transfer lithium by a paddle-wheel mechanism, so that an enhanced lithium ion conductivity may be provided. Accordingly, the battery resistance may be reduced, and the capacity and power properties of the battery may be improved. The paddle-wheel mechanism may refer to a phenomenon that elements including oxygen rotates around a sulfur ion constituting an anion to move a lithium ion, thereby lowering an activation energy required for movement of the lithium ions.

In exemplary embodiments, the coating may include both the lithium-sulfur compound and the metal hydroxide. Accordingly, resistance may be reduced and life-span properties may be improved compared to when only the lithium-sulfur compound is present. Additionally, the residual lithium may be sufficiently removed, and thus life-span properties may be improved compared to when only the metal hydroxide is present.

Figure 2:
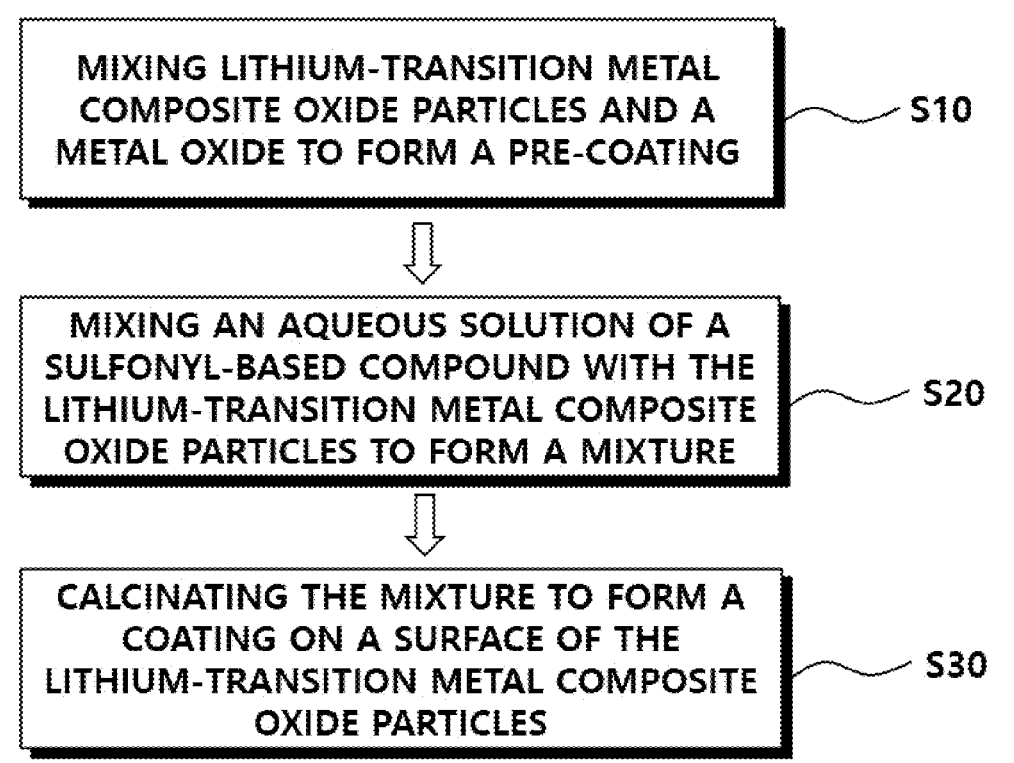
FIG. 2 is a process flow diagram illustrating a method of manufacturing a cathode active material in accordance with exemplary embodiments.

FIG. 2 is a process flow diagram illustrating a method of manufacturing a cathode active material in accordance with exemplary embodiments.

Hereinafter, a method of manufacturing the above-described cathode active material according to embodiments of the cathode active material for a lithium secondary battery is provided with reference to FIG. 2.

Referring to FIG. 2, lithium-transition metal composite oxide particles and a metal oxide is mixed to form a pre-coating on surfaces of the lithium-transition metal composite oxide particles (e.g., in a phase of S10).

In some embodiments, the pre-coating may be performed by a dry mixing (e.g., dry-coating) of the lithium-transition metal composite oxide particles and the metal oxide.

For example, the lithium-transition metal composite oxide particle may be prepared by reacting a transition metal precursor with a lithium precursor. The transition metal precursor (e.g., a Ni—Co—Mn precursor) may be prepared through a co-precipitation reaction.

For example, the transition metal precursor may be prepared through a co-precipitation reaction of metal salts. The metal salts may include a nickel salt, a manganese salt and a cobalt salt.

Examples of the nickel salt include nickel sulfate, nickel hydroxide, nickel nitrate, nickel acetate, a hydrate thereof, etc. Examples of the manganese salt include manganese sulfate, manganese acetate, a hydrate thereof, etc. Examples of the cobalt salt include cobalt sulfate, cobalt nitrate, cobalt carbonate, a hydrate thereof, etc.

The metal salts may be mixed with a precipitating agent and/or a chelating agent at a ratio satisfying a content or a concentration ratio of each metal described with reference to Chemical Formula 1 to prepare an aqueous solution. The transition metal precursor may be prepared by co-precipitating the aqueous solution in a reactor.

The precipitating agent may include an alkaline compound such as sodium hydroxide (NaOH), sodium carbonate ($Na_2CO_3$), etc. The chelating agent may include, e.g., aqueous ammonia (e.g., $NH_3H_2O$), ammonium carbonate (e.g., $NH_3HCO_3$), etc.

A temperature of the co-precipitation reaction may be controlled, e.g., in a range from about 40° C. to 60° C. A reaction time may be adjusted in a range from about 24 hours to 72 hours.

The lithium precursor may include, e.g., lithium carbonate, lithium nitrate, lithium acetate, lithium oxide, lithium hydroxide, etc. These may be used alone or in combination thereof.

In some embodiments, the metal oxide may include at least one selected from the group consisting of $Al_2O_3$, $TiO_2$, $Ti_2O_3$, $ZrO_2$, $B_2O_3$, $SrO_2$, $SrAl_2O_4$, $SrTiO_3$, $SrWO_4$, BaO, $WO_3$, $(NH_4)_{10}H_2(W_2O_7)_6$, MgO, $Ta_2O_5$, $Nb_2O_5$, $MoO_3$, $H_4[W_{12}SiO_{40}]$, $H_4SiO_4.12MoO_3$ and $(NH_4)_2MoO_4$. In this case, the metal oxide may be sufficiently converted to the metal hydroxide, so that a secondary battery having improved life-span properties and low resistance may be achieved.

In exemplary embodiments, a mixture is formed by mixing the lithium-transition metal composite oxide particles having the pre-coating formed thereon and an aqueous solution of a sulfur-containing compound (e.g., in a phase of S20).

In some embodiments, an solvent of the aqueous solution may be de-ionized water (DIW).

In some embodiments, the sulfur-containing compound may include a sulfonyl-based compound, e.g., at least one selected from the group consisting of $((NH_4)_2SO_4$, $SO_3NH_3$, $NH_4SO_3NH_2$, $Al_2(SO_4)_3$, $AlK(SO_4)_2$, $AlNH_4(SO_4)_2$, $Ti(SO_4)_2$, $TiOSO_4$, $SrSO_4$, $KHSO_4$, $NaHSO_4$ and $KHSO_4$.

In exemplary embodiments, the mixture is calcinated to form a coating on the surface of the lithium-transition metal composite oxide particles (e.g., S30).

As described above, the lithium-transition metal composite oxide particles and the sulfur-containing compound aqueous solution may be mixed and calcinated. Accordingly, the sulfur-containing compound may be converted into a lithium-sulfur compound by reacting with a residual lithium present on the surface of the lithium-transition metal composite oxide particle and between the primary particles. Thus, the residual lithium may be removed to improve the life-span properties of the secondary battery.

For example, the sulfur-containing compound may act as an oxidizing agent for the metal oxides included in the pre-coating. In this case, the pre-coated metal oxide may be converted into a metal hydroxide having a stronger binding energy. Accordingly, high-temperature life-span properties and stability of the secondary battery may be improved.

In an embodiment, some of the sulfur-containing compound may react with the residual lithium present on the surface of the lithium-transition metal composite oxide particles to be converted into the lithium-sulfur compound, and a remainder may convert the metal oxide included in the pre-coating into the metal hydroxide. Thus, the coating including the lithium-sulfur compound and the metal hydroxide may be formed on the surface of the lithium-transition metal composite oxide particles.

For example, the pre-coating may be converted into the coating by the mixing process.

For example, impurities present on the surface of the lithium-transition metal composite oxide particles may be removed by the mixing process. For example, the lithium precursor (a lithium salt) may be used in an excess amount to improve a yield of the lithium metal oxide particles or to stabilize the synthesis process. In this case, the lithium precursor including lithium hydroxide (LiOH) and lithium carbonate ($Li_2CO_3$) may remain on the surface of the lithium-transition metal composite oxide particles.

Further, for example, as a Ni content of the lithium-transition metal composite oxide particles becomes higher, the calcination may be performed at a lower temperature in a fabrication of the cathode. In this case, the residual lithium content on the surface of the lithium-transition metal composite oxide particles may be increased The residual lithium may be removed by washing the residual lithium with substantially the same amount of water as that of the cathode active material (a washing treatment with water). However, in this case, an oxidation of the surface of the lithium-transition metal composite oxide particle and a side reaction with water may occur to cause damages or collapse of a layered structure of the primary particles.

Further, as the layered structure may be transformed by water into a face centered cubic structure, a spinel structure and/or a rock salt structure rather than a hexagonal dense structure, and a lithium-nickel-based oxide may be hydrolyzed to form NiO or $Ni(OH)_2$ to generate nickel impurities. The modified structures are irreversible structures, and thus lithium transfer may be hindered during charging and discharging. Accordingly, the initial capacity and capacity retention of the secondary battery may be degraded.

According to exemplary embodiments of the present invention, a mixing process (e.g., an initial wetting method) may be performed using the aqueous solution of the sulfur-containing compound without the water washing after dry coating of the metal oxide. Accordingly, passivation by the sulfur-containing compound may be implemented on the surface of the lithium-transition metal composite oxide particles.

For example, the lithium-sulfur compound in which lithium and sulfur are bonded may be formed between the coating and the primary particles included in the lithium-transition metal composite oxide particles.

For example, the term "initial wetting method" used herein refers to a method that 20 wt % or less of water or a sulfonyl-based compound aqueous solution is added based on a total weight of metal composite oxide particles by, e.g., a spraying without a washing treatment by adding water in an amount substantially equal to or similar to the total weight of the lithium-transition metal composite oxide particles and stirring.

The washing treatment with water may not be performed, so that the lithium-transition metal composite oxide particles may not include primary particles having, e.g., a face-centered cubic structure. Thus, the residual lithium may be effectively removed while preventing oxidation and damages to the layered structure by water on the particle surface.

In some embodiments, an amount of a solvent of the sulfur-containing compound aqueous solution may be from 2 wt % to 20 wt % based on the total weight of the lithium-transition metal composite oxide particles. In the above range, the damages or collapse of the layered structure of the primary particles may be prevented while sufficiently forming the lithium-sulfur compound on the surface of the lithium-transition metal composite oxide particles and at positions where the residual lithium was present.

In some embodiments, an amount of the sulfur-containing compound added to the solvent may be from 0.5 wt % to 1.8 wt % based on the total weight of the lithium-transition metal composite oxide particles. In the above range, a sufficient amount of the sulfur-containing compound may react with the residual lithium to form the lithium-sulfur compound, and an excessively high sulfur content in the cathode active material may be prevented. Accordingly, the life-span properties of the battery may be improved while maintaining the power properties of the battery.

In some embodiments, the calcination may be performed at a temperature ranging from 250° C. to 550° C. In the above range, the metal oxide of the pre-coating may be sufficiently converted to the metal hydroxide to form the coating while sufficiently removing the residual lithium.

Additionally, in the calcination of the above temperature range, the metal hydroxide may be prevented from being converted again into the metal oxide in an excessive temperature. Accordingly, the lifespan characteristics and capacity characteristics of the battery may be improved.

Figure 3:
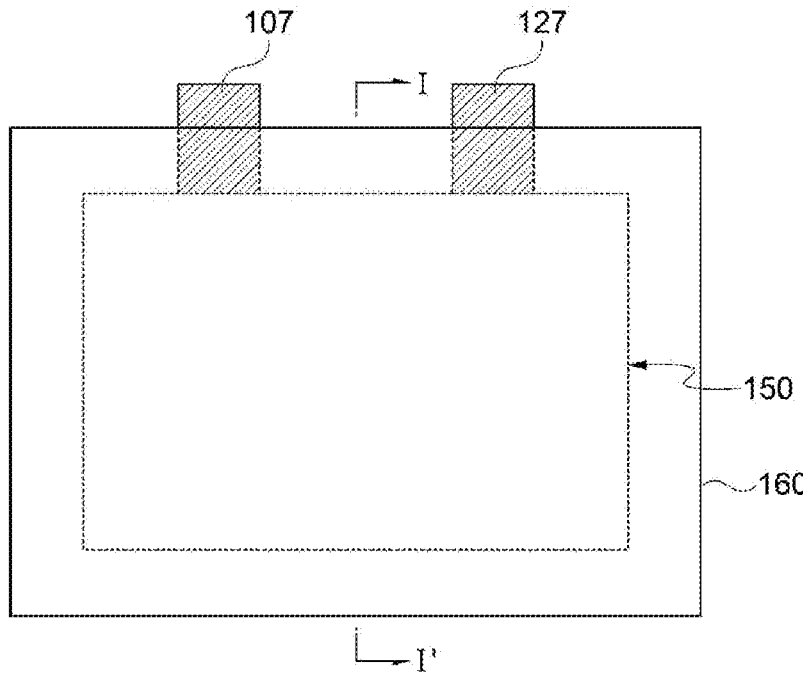
FIGS. 3 and 4 are a schematic plan view and a cross-sectional view, respectively, of a lithium secondary battery in accordance with exemplary embodiments.
Figure 4:
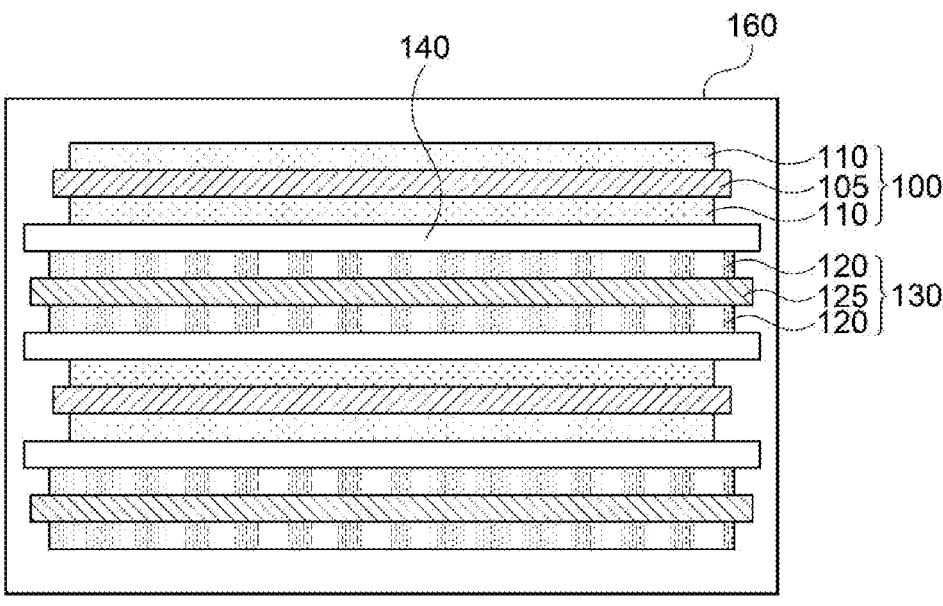

FIGS. 3 and 4 are a schematic plan view and a cross-sectional view, respectively, of a lithium secondary battery in accordance with exemplary embodiments.

Hereinafter, a lithium secondary battery including a cathode including the cathode active material for a lithium secondary battery as described above is provided with reference to FIGS. 3 and 4.

Referring to FIGS. 3 and 4, the lithium secondary battery may include a cathode 100 including the cathode active material including the coating containing the above-described lithium-sulfur compound and the metal hydroxide, and an anode 130 facing the cathode 100.

The cathode 100 may include a cathode active material layer 110 formed by coating the above-described cathode active material including the lithium-transition metal oxide particles on the cathode current collector 105.

For example, a slurry may be prepared by mixing and stirring the cathode active material prepared by the above-described method with a binder, a conductive material and/or a dispersive agent in a solvent. The slurry may be coated on at least one surface of the cathode current collector 105, and dried and pressed to form the cathode 100.

The cathode current collector 105 may include stainless-steel, nickel, aluminum, titanium, copper or an alloy thereof. Preferably, aluminum or an alloy thereof may be used.

The binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer 110 may be reduced, and an amount of the cathode active material may be relatively increased. Thus, capacity and power of the lithium secondary battery may be further improved.

The conductive material may be added to facilitate electron mobility between active material particles. For example, the conductive material may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$, etc.

The anode 130 may include an anode current collector 125 and an anode active material layer 120 formed by coating an anode active material on a surface of the anode current collector 125.

The anode active material may include a material commonly used in the related art which may be capable of adsorbing and ejecting lithium ions. For example, a carbon-based material such as a crystalline carbon, an amorphous carbon, a carbon complex or a carbon fiber, a lithium alloy, silicon (Si)-based compound, tin, etc., may be used.

The amorphous carbon may include a hard carbon, cokes, a mesocarbon microbead (MCMB) fired at a temperature of 1500° C. or less, a mesophase pitch-based carbon fiber (MPCF), etc. The crystalline carbon may include a graphite-based material such as natural graphite, graphitized cokes, graphitized MCMB, graphitized MPCF, etc. The lithium alloy may further include aluminum, zinc, bismuth, cadmium, antimony, silicon, lead, tin, gallium, indium, etc.

The anode current collector 125 may include, e.g., gold, stainless steel, nickel, aluminum, titanium, copper or an alloy thereof, preferably may include copper or a copper alloy.

In some embodiments, a slurry may be prepared by mixing and stirring the anode active material with a binder, a conductive material and/or a dispersive agent in a solvent. The slurry may be coated on the anode current collector, and then dried and pressed to form the anode 130.

The binder and the conductive material substantially the same as or similar to those mentioned above may be used in the anode 130. In some embodiments, the binder for forming the anode 130 may include an aqueous binder such as styrene-butadiene rubber (SBR) for a compatibility with the carbon-based material, and carboxymethyl cellulose (CMC) may also be used as a thickener.

The separation layer 140 may be interposed between the cathode 100 and the anode 130. The separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 140 may also include a non-woven fabric formed from a glass fiber with a high melting point, a polyethylene terephthalate fiber, or the like.

In exemplary embodiments, an electrode cell may be defined by the cathode 100, the anode 130 and the separation layer 140, and a plurality of the electrode cells may be stacked to form the electrode assembly 150 that may have e.g., a jelly roll shape. For example, the electrode assembly 150 may be formed by winding, laminating or folding the separation layer 140.

The electrode assembly 150 may be accommodated together with an electrolyte in an outer case 160 to define the lithium secondary battery. In exemplary embodiments, a non-aqueous electrolyte may be used as the electrolyte.

The non-aqueous electrolyte may include a lithium salt and an organic solvent. The lithium salt may be represented by $Li^+X^-$, and an anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_{6P}^-$, $CF_3SO_3^-$, $CF_3CF_2SO_3^-$, $(CF_3SO_2)_2N^-$, $(FSO_2)_2N^-$, $CF_3CF_2$ $(CF_3)_2CO^-$, $(CF_3SO_2)_2CH^-$, $(SF_5)_3C^-$, $(CF_3SO_2)_3C^-$, $CF_3$ $(CF_2)_7SO_3^-$, $CF_3CO_2^-$, $CH_3CO_2^-$, $SCN^-$, $(CF_3$ $CF_2SO_2)_2N^-$, etc.

The organic solvent may include, e.g., propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination of two or more therefrom.

As illustrated in FIG. 3, electrode tabs (a cathode tab and an anode tab) may protrude from the cathode current collector 105 and the anode current collector 125 included in each electrode cell to one side of the outer case 160. The electrode tabs may be welded together with the one side of the outer case 160 to be connected to an electrode lead (a cathode lead 107 and an anode lead 127) that may be extended or exposed to an outside of the outer case 160.

The lithium secondary battery may be manufactured in, e.g., a cylindrical shape using a can, a square shape, a pouch shape or a coin shape.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Preparation Example: Lithium-Transition Metal Composite Oxide Particles $NiSO_4$, $CoSO_4$ and $MnSO_4$ were mixed in a molar ratio of 0.885:0.090:0.025, respectively using distilled water from which dissolved oxygen was removed by bubbling with $N_2$ for 24 hours. The solution was put into a reactor at 50° C., and NaOH and $NH_3H_2O$ were used as a precipitating agent and a chelating agent, respectively, to proceed with a co-precipitation reaction for 48 hours to obtain $Ni_{0.885}Co_{0.09}Mn_{0.025}(OH)_2$ as a transition metal precursor. The obtained precursor was dried at 80° C. for 12 hours and then re-dried at 110° C. for 12 hours.

Lithium hydroxide and the transition metal precursor were added in a ratio of 1.01:1 in a dry high-speed mixer and uniformly mixed for 5 minutes. The mixture was placed in a kiln, and then a temperature was raised to a range from 730° C. to 750° C. at a heating rate of 2° C./min and maintained at the temperature range of 730° C. to 750° C. for 10 hours. Oxygen was passed continuously at a flow rate of 20 mL/min during the temperature raise and maintenance. After the calcination, natural cooling was performed to room temperature, and grinding and classification were performed to prepare lithium-transition metal composite oxide particles having a composition of $LiNi_{0.858}Co_{0.09}Mn_{0.025}O_2$.

Example 1

Input of Metal Oxide and Pre-Coating (S10)

The lithium-transition metal composite oxide particles of Preparation Example and an $Al_2O_3$ powder were mixed to form a pre-coating on a surface of the lithium-transition metal composite oxide particles (dry coating).

In the mixing, $Al_2O_3$ was added by 0.3 mol % based on a total number of moles of the lithium-transition metal composite oxide particles.

Preparation and Mixing of Sulfur-Containing Compound Aqueous Solution (S20) and Calcination (S30)

1.2 wt % of an ammonium sulfate $((NH_4)_2SO_4)$ powder based on a total weight of the lithium-transition metal composite oxide particles was added to 10 wt % of pure water based on the total weight of the lithium-transition metal composite oxide particles, followed by stirring to prepare a sulfur-containing compound aqueous solution.

The sulfur-containing compound aqueous solution was added to the obtained lithium-transition metal composite oxide particles to form a mixture.

The prepared mixture was placed in a kiln, heated to 400° C. at a temperature increasing rate of 2° C./min while supplying oxygen at a flow rate of 20 L/min, and maintained at the elevated temperature for 10 hours. After the calcination, classification was performed using 325 mesh to obtain a cathode active material.

Fabrication of Lithium Secondary Battery

A secondary battery was manufactured using the cathode active material obtained by the above-described method. Specifically, a cathode mixture was prepared by mixing the cathode active material, Denka Black as a conductive material and PVDF as a binder in a mass ratio of 93:5:2, respectively. The cathode mixture was coated on an aluminum current collector, dried and pressed to prepare a cathode. A target electrode density of the cathode after the pressing was adjusted to 3.0 g/cc.

A lithium metal was used as an anode active material.

The cathode and the anode prepared as described above were stacked by notching in a circular shape having a diameter of Φ14 and Φ16, respectively, and a separator (polyethylene, thickness 13 μm) notched with Φ19 was interposed between the cathode and the anode to form an electrode cell. The electrode cell was put in a coin cell exterior material having a diameter of 20 mm and a height of 1.6 mm, and an electrolyte was injected to form an assembly, and then aged for 12 hours or more so that the electrolyte was impregnated at an inside of the electrode.

The electrolyte was prepared by preparing 1M $LiPF_6$ solution in a mixed solvent of EC/EMC (30/70; volume ratio).

The secondary battery prepared as described above was subjected to a formation charge and discharge (charge condition CC-CV 0.1 C 4.3V 0.005 C CUT-OFF, discharge condition CC 0.1 C 3V CUT-OFF).

Examples 2 to 5

A cathode active material and a lithium secondary battery were prepared by the same method as that in Example 1, except that $Al_2O_3$ was added in an amount shown in Table 1 below.

Example 6

A cathode active material and a lithium secondary battery were prepared by the same method as that in Example 1, except that 0.4 wt % of ammonium sulfate powder was added based on the total weight of the lithium-transition metal composite oxide particles.

Example 7

A cathode active material and a lithium secondary battery were prepared by the same method as that in Example 1, except that 0.8 wt % of ammonium sulfate powder was added based on the total weight of the lithium-transition metal composite oxide particles.

Example 8

A cathode active material and a lithium secondary battery were prepared by the same method as that in Example 1, except that 1.6 wt % of ammonium sulfate powder was added based on the total weight of the lithium-transition metal composite oxide particles.

Example 9

A cathode active material and a lithium secondary battery were prepared by the same method as that in Example 1, except that 2.0 wt % of ammonium sulfate powder was added based on the total weight of the lithium-transition metal composite oxide particles.

Example 10

A cathode active material and a lithium secondary battery were prepared by the same method as that in Example 1, except that $WO_3$ instead of $Al_2O_3$ was added as the metal oxide.

Examples 11 to 14

A cathode active material and a lithium secondary battery were prepared by the same method as that in Example 10, except that $WO_3$ was added in an amount as shown in Table 1 below.

Example 15

A cathode active material and a lithium secondary battery were prepared by the same method as that in Example 10, except that 0.4 wt % of ammonium sulfate powder was added based on the total weight of the lithium-transition metal composite oxide particles.

Example 16

A cathode active material and a lithium secondary battery were prepared by the same method as that in Example 10, except that 0.8 wt % of ammonium sulfate powder was added based on the total weight of the lithium-transition metal composite oxide particles.

Example 17

A cathode active material and a lithium secondary battery were prepared by the same method as that in Example 10, except that 1.6 wt % of ammonium sulfate powder was added based on the total weight of the lithium-transition metal composite oxide particles.

Example 18

A cathode active material and a lithium secondary battery were prepared by the same method as that in Example 10, except that 2.0 wt % of ammonium sulfate powder was added based on the total weight of the lithium-transition metal composite oxide particles.

Examples 19 and 20

A cathode active material and a lithium secondary battery were prepared by the same method as that in Example 1, except that the calcination was performed at a temperature as shown in Table 2 below.

Examples 21 and 22

A cathode active material and a lithium secondary battery were prepared by the same method as that in Example 10, except that the calcination was performed at the temperatures as shown in Table 2 below.

Example 23

A cathode active material and a lithium secondary battery were prepared by the same method as that in Example 1, except that potassium hydrogen sulfate (KHSO$_4$) powder was added instead of ammonium sulfate powder as the sulfur-containing compound and the calcination was performed at 300° C.

Example 24

A cathode active material and a lithium secondary battery were prepared by the same method as that in Example 10, except that potassium hydrogen sulfate (KHSO$_4$) powder was added instead of ammonium sulfate powder as the sulfur-containing compound and that the calcination was performed at 300° C.

Comparative Example 1

A cathode active material and a lithium secondary battery were prepared by the same method as that in Example 1, except that pre-coating (S10), mixing the sulfur-containing compound aqueous solution (S20) and the calcination (S30) were not performed on the lithium-transition metal composite oxide particles prepared according to Preparation Example.

Comparative Example 2

A cathode active material and a lithium secondary battery were prepared by the same method as that in Example 1, except that mixing the sulfur-containing compound aqueous solution (S20) was not performed.

Comparative Example 3

A cathode active material and a lithium secondary battery were prepared by the same method as that in Example 1, except that the pre-coating (S10) was not performed on the lithium-transition metal composite oxide particles prepared according to Preparation Example.

Comparative Example 4

A cathode active material and a lithium secondary battery were prepared by the same method as that in Example 1, except that 10 wt % of pure water based on the total weight of the lithium-transition metal composite oxide particles was mixed with the lithium-transition metal composite oxide particles instead of adding the sulfur-containing compound aqueous solution.

Comparative Example 5

A cathode active material and a lithium secondary battery were prepared by the same method as that in Example 1, except that WO$_3$ was added instead of Al$_2$O$_3$, and 10 wt % of pure water was mixed with the lithium-transition metal composite oxide particles based on the total weight of the lithium-transition metal composite oxide particles instead of adding the sulfur-containing compound aqueous solution.

Comparative Example 6

A cathode active material and a lithium secondary battery were prepared by the same method as that in Example 1, except that Al(OH)$_3$ was added instead of Al$_2$O$_3$.

Experimental Example 1

Measurement of Sulfur (S) Content

A CS analyzer (carbon/sulfur analyzer; model name: CS844, manufacturer: LECO) was used to measure a sulfur (S) content in the lithium-transition metal composite oxide particles obtained according to the above-described Examples and Comparative Examples. The amount of a sample was selected according to a measurable value range of a standard sample using when a calibration curve was prepared.

Specifically, each of the lithium-transition metal composite oxide particles obtained according to Examples and Comparative Examples was subdivided into 0.02 g to 0.04 g, and a combusting agent (LECOCEL II) and an iron chip were mixed together in a 1:1 ratio in a ceramic crucible. In a high-frequency inductive device, O$_2$ as a combustion gas was supplied at a flow rate of 3 L/min and combusted at about 2,600° C. to 2,700° C., and then a sulfur oxide-based inorganic compound gas (e.g., sulfuric acid gas (SO$_2$)) generated by the combustion was passed through an infrared detection cell. Thereafter, the content of sulfur in the lithium-transition metal composite oxide particles was quantitatively detected by measuring a change of an amount of infrared absorption compared to a blank.

Types and input amounts of the metal oxide, and types and input amounts of the sulfur-containing compound were measured as shown in Tables 1 and 2 below.

TABLE 1

| No. | Metal Compound Input (S10) Type | Input Amount (mol %) | Input of of sulfur-containing compound aqueous solution (S20) Type | Input amount of sulfur-containing compound (wt %) | Temperature of calcination (S30) (° C.) |
|---|---|---|---|---|---|
| Example 1 | Al$_2$O$_3$ | 0.3 | (NH$_4$)$_2$SO$_4$ | 1.2 | 400 |
| Example 2 | Al$_2$O$_3$ | 0.1 | (NH$_4$)$_2$SO$_4$ | 1.2 | 400 |
| Example 3 | Al$_2$O$_3$ | 0.5 | (NH$_4$)$_2$SO$_4$ | 1.2 | 400 |
| Example 4 | Al$_2$O$_3$ | 0.05 | (NH$_4$)$_2$SO$_4$ | 1.2 | 400 |
| Example 5 | Al$_2$O$_3$ | 0.6 | (NH$_4$)$_2$SO$_4$ | 1.2 | 400 |
| Example 6 | Al$_2$O$_3$ | 0.3 | (NH$_4$)$_2$SO$_4$ | 0.4 | 400 |
| Example 7 | Al$_2$O$_3$ | 0.3 | (NH$_4$)$_2$SO$_4$ | 0.8 | 400 |
| Example 8 | Al$_2$O$_3$ | 0.3 | (NH$_4$)$_2$SO$_4$ | 1.6 | 400 |
| Example 9 | Al$_2$O$_3$ | 0.3 | (NH$_4$)$_2$SO$_4$ | 2.0 | 400 |
| Example 10 | WO$_3$ | 0.3 | (NH$_4$)$_2$SO$_4$ | 1.2 | 400 |
| Example 11 | WO$_3$ | 0.1 | (NH$_4$)$_2$SO$_4$ | 1.2 | 400 |
| Example 12 | WO$_3$ | 0.5 | (NH$_4$)$_2$SO$_4$ | 1.2 | 400 |

TABLE 1-continued

| No. | Metal Compound Input (S10) Type | Input Amount (mol %) | Input of of sulfur-containing compound aqueous solution (S20) Type | Input amount of sulfur-containing compound (wt %) | Temperature of calcination (S30) (° C.) |
|---|---|---|---|---|---|
| Example 13 | WO$_3$ | 0.05 | (NH$_4$)$_2$SO$_4$ | 1.2 | 400 |
| Example 14 | WO$_3$ | 0.6 | (NH$_4$)$_2$SO$_4$ | 1.2 | 400 |
| Example 15 | WO$_3$ | 0.3 | (NH$_4$)$_2$SO$_4$ | 0.4 | 400 |
| Example 16 | WO$_3$ | 0.3 | (NH$_4$)$_2$SO$_4$ | 0.8 | 400 |
| Example 17 | WO$_3$ | 0.3 | (NH$_4$)$_2$SO$_4$ | 1.6 | 400 |
| Example 18 | WO$_3$ | 0.3 | (NH$_4$)$_2$SO$_4$ | 2.0 | 400 |

TABLE 2

| No. | Metal Compound Input (S10) Type | Input Amount (mol %) | Input of sulfur-containing compound aqueous solution (S20) Type | Input amount of sulfur-containing compound (wt %) | Temperature of calcination (S30) (° C.) |
|---|---|---|---|---|---|
| Example 19 | Al$_2$O$_3$ | 0.3 | (NH$_4$)$_2$SO$_4$ | 1.2 | 200 |
| Example 20 | Al$_2$O$_3$ | 0.3 | (NH$_4$)$_2$SO$_4$ | 1.2 | 600 |
| Example 21 | WO$_3$ | 0.3 | (NH$_4$)$_2$SO$_4$ | 1.2 | 200 |
| Example 22 | WO$_3$ | 0.3 | (NH$_4$)$_2$SO$_4$ | 1.2 | 600 |
| Example 23 | Al$_2$O$_3$ | 0.3 | KHSO$_4$ | 0.8 | 300 |
| Example 24 | WO$_3$ | 0.3 | KHSO$_4$ | 0.8 | 300 |
| Comparative Example 1 | — | — | — | — | — |
| Comparative Example 2 | Al$_2$O$_3$ | 0.3 | — | — | 400 |
| Comparative Example 3 | — | — | (NH$_4$)$_2$SO$_4$ | 1.2 | 400 |
| Comparative Example 4 | Al$_2$O$_3$ | 0.3 | pure water | — | 400 |
| Comparative Example 5 | WO$_3$ | 0.3 | pure water | — | 400 |
| Comparative Example 6 | Al(OH)$_3$ | 0.3 | — | — | 400 |

Experimental Example 2

(1) Measurement of Residual Lithium (Li$_2$CO$_3$) Content

When using an HCl titration method based on a Wader Method, which is generally used when analyzing residual lithium of the cathode active material, an accurate residual lithium value may not be obtained because the coating material obtained from the sulfonyl compound and the metal oxide is titrated with HCl.

To resolve the problem, Li$_2$CO$_3$ content was calculated by considering atomic weights of Li, C and O in the carbon (C) content obtained from the CS analysis performed in Experimental Example 1. An accuracy of this analysis method was confirmed through the following experiment.

The C content obtained through the CS analysis and the Li$_2$CO$_3$ content obtained through the conventional HCl titration method were compared for the cathode active material of Comparative Example 1 in which the sulfur-containing additive and the metal oxide treatment were not performed, and both values were consistent with each other.

(2) Measurement of XPS Binding Energy

The cathode active materials of Examples and Comparative Examples were analyzed through an X-ray photoelectron spectroscopy (XPS) to measure a binding energy values at a point where Al$_{2p}$ peak or W$_{4f7/2}$ peak was formed.

(3) Measurement of Initial Charge/Discharge Capacity and Evaluation on Initial Capacity Efficiency The lithium secondary battery of Examples and Comparative Examples were charged (CC-CV 0.1 C 4.3V 0.005 C CUT-OFF) in a chamber at 25° C. to measure a battery capacity (initial charge capacity), and then discharged (CC 0.1 C 3.0V CUT-OFF) to measure a battery capacity (initial discharge capacity).

The initial capacity efficiency was evaluated as a percentage (%) obtained by dividing the measured initial discharge capacity with the measured initial charge capacity.

(4) Measurement of Voltage Drop at Initial Discharge

If a current corresponding to a theoretical potential (4.3V) when lithium enters and exits from a transition metal oxide is applied, a polarization occurs due to a surface resistance of the active material, and a difference between a theoretical voltage and an actual voltage is generated.

A voltage at a point of a slope change after a start of a discharge was subtracted based on a charge cut-off voltage value (4.3V) to measure an initial discharge voltage drop.

The point at which the slope of the discharge curve changes is within 1 second after the start of the discharge. As the point becomes delayed, a potential difference due to an ohmic resistance and an interface resistance becomes greater.

(5) Measurement of Capacity Retention (Life-Span Properties) During Repeated Charging and Discharging The lithium secondary batteries of Examples and Comparative Examples were charged (CC/CV 0.5 C 4.3V 0.05 C CUT-OFF) and discharged (CC 1.0 C 3.0V CUT-OFF) repeatedly 300 times. Capacity retention was evaluated as a percentage of obtained by dividing the capacity at the 300th cycle with the discharge capacity at the 1st cycle.

The results are shown in Tables 3 and 4 below.

In Examples 4 and 13 where the input amount of the metal oxide was less than 0.1 mol % based on the total number of moles of the lithium-transition metal composite oxide particles, a generation amount of the metal hydroxide was small relatively to those from other Examples, and the life-span properties were relatively degraded.

In Examples 5 and 14 where the input amount of the metal oxide exceeded 0.5 mol % based on the total number of moles of the lithium-transition metal composite oxide particles, the resistance of the coating was relatively increased compared to those from Examples, and the initial capacity was relatively lowered and the voltage drop was increased.

TABLE 3

| No. | $Li_2CO_3$ (ppm) | S content (ppm) | XPS binding energy (eV) $Al_{2p}$ | XPS binding energy (eV) $W_{4f7/2}$ | initial charge capacity (mAh/g) | initial discharge capacity (mAh/g) | initial capacity efficiency (%) | initial discharge voltage drop(V) | capacity retention (%) |
|---|---|---|---|---|---|---|---|---|---|
| Example 1 | 1,968 | 3,510 | 73.6 | — | 235.1 | 214.9 | 91.4 | 0.11 | 75 |
| Example 2 | 2,030 | 3,450 | 73.7 | — | 235.1 | 214.7 | 91.3 | 0.12 | 75 |
| Example 3 | 1,845 | 3,550 | 73.6 | — | 234.8 | 213.0 | 90.7 | 0.20 | 77 |
| Example 4 | 2,153 | 3,410 | 73.7 | — | 235.3 | 215.2 | 91.5 | 0.10 | 71 |
| Example 5 | 1,845 | 3,490 | 73.5 | — | 234.4 | 211.9 | 90.4 | 0.29 | 77 |
| Example 6 | 2,522 | 1,450 | 73.5 | — | 235.2 | 216.0 | 91.8 | 0.09 | 69 |
| Example 7 | 2,276 | 2,400 | 73.5 | — | 235.3 | 215.5 | 91.6 | 0.12 | 73 |
| Example 8 | 1,845 | 4,410 | 73.6 | — | 234.7 | 213.4 | 90.9 | 0.24 | 75 |
| Example 9 | 1,784 | 5,400 | 73.7 | — | 232.1 | 210.1 | 90.5 | 0.41 | 74 |
| Example 10 | 1,415 | 3,490 | — | 35.5 | 234.1 | 215.1 | 91.9 | 0.09 | 71 |
| Example 11 | 1,415 | 3,430 | — | 35.5 | 234.2 | 215.6 | 92.1 | 0.09 | 67 |
| Example 12 | 1,292 | 3,400 | — | 35.5 | 233.9 | 215.0 | 91.9 | 0.18 | 71 |
| Example 13 | 2,399 | 3,500 | — | 35.4 | 233.3 | 214.4 | 91.9 | 0.08 | 66 |
| Example 14 | 1,230 | 3,500 | — | 35.6 | 234.2 | 211.7 | 90.4 | 0.25 | 73 |
| Example 15 | 2,460 | 1,490 | — | 35.5 | 234.8 | 215.8 | 91.9 | 0.07 | 68 |
| Example 16 | 1,845 | 2,430 | — | 35.5 | 234.3 | 215.4 | 91.9 | 0.10 | 70 |
| Example 17 | 1,353 | 4,400 | — | 35.5 | 233.6 | 213.5 | 91.4 | 0.20 | 72 |
| Example 18 | 1,230 | 5,500 | — | 35.5 | 232.3 | 210.5 | 90.6 | 0.30 | 74 |

TABLE 4

| No. | $Li_2CO_3$ (ppm) | S content (ppm) | XPS binding energy (eV) $Al_{2p}$ | XPS binding energy (eV) $W_{4f7/2}$ | initial charge capacity (mAh/g) | initial discharge capacity (mAh/g) | initial capacity efficiency (%) | initial discharge voltage drop (V) | capacity retention (%) |
|---|---|---|---|---|---|---|---|---|---|
| Example 19 | 2,768 | 3,500 | 73.2 | — | 235.2 | 214.1 | 91.0 | — | 64 |
| Example 20 | 1,845 | 3,600 | 73.2 | — | 233.1 | 209.1 | 89.7 | — | 77 |
| Example 21 | 2,583 | 3,520 | — | 35.1 | 235.6 | 214.1 | 90.9 | — | 66 |
| Example 22 | 1,230 | 3,480 | — | 35.1 | 233.1 | 209.1 | 89.7 | — | 77 |
| Example 23 | 2,460 | 2,500 | 73.6 | — | 234.8 | 213.8 | 91.1 | — | 80 |
| Example 24 | 1,907 | 2,490 | — | 35.5 | 233.9 | 214.8 | 91.8 | — | 75 |
| Comparative Example 1 | 5,105 | 500 | — | — | 234.7 | 205.9 | 87.7 | — | 36 |
| Comparative Example 2 | 4,920 | 490 | 73.2 | — | 235.8 | 207.1 | 87.8 | 0.17 | 59 |
| Comparative Example 3 | 3,752 | 3,400 | — | — | 235.1 | 214.9 | 91.4 | 0.12 | 62 |
| Comparative Example 4 | 4,428 | 500 | 73.2 | — | 235.5 | 208.4 | 88.5 | | 53 |
| Comparative Example 5 | 4,305 | 480 | — | 35.1 | 235.5 | 208.1 | 88.4 | 0.14 | 60 |
| Comparative Example 6 | 4,982 | 490 | 73.1 | — | 235.1 | 207.1 | 88.1 | | 61 |

Referring to Tables 3 and 4, in Examples where the initial wetting method was performed by mixing the aqueous solution of the sulfur-containing compound after dry-coating with the metal oxide, the residual lithium content was entirely decreased and improved initial capacity efficiency and capacity retention were provided compared to those from Comparative Examples.

Figure 5:
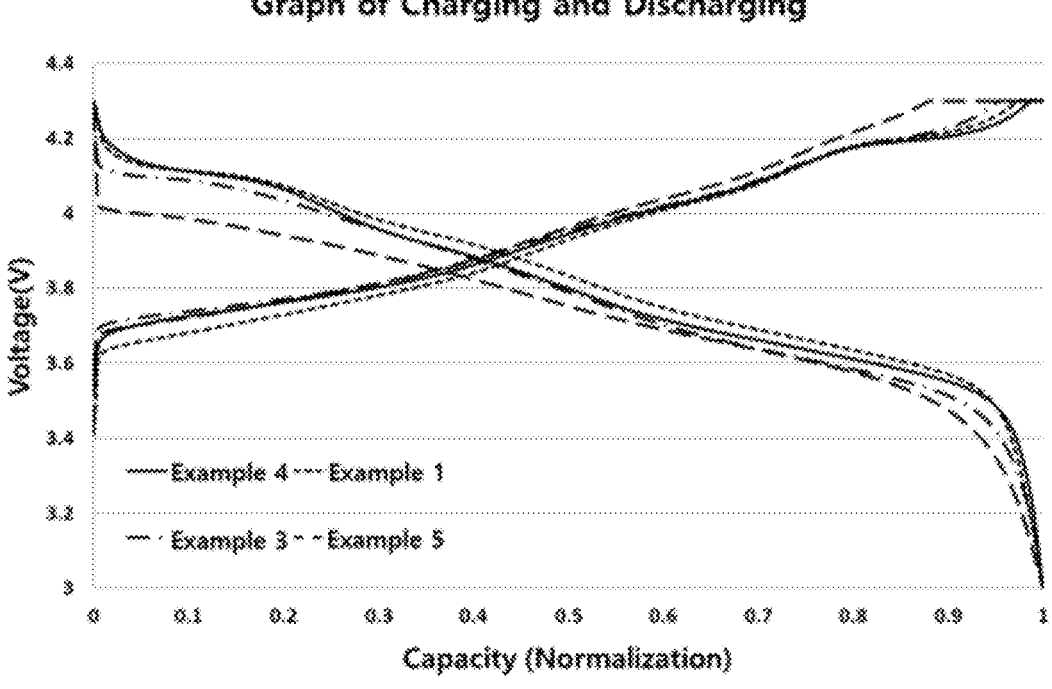
FIG. 5 is a graph showing a voltage drop according to an input amount of a metal oxide in a method of manufacturing in accordance with exemplary embodiments.

FIG. 5 is a graph showing a voltage drop according to an input amount of a metal oxide in a method of manufacturing in accordance with exemplary embodiments.

Referring to FIG. 5, in Example 5, the voltage drop occurred in the initial stage of discharge due to the excessive input of the metal oxide.

In Examples 6 and 15 where the sulfur content contained in the cathode active material was less than 1,500 ppm based on on the total weight of the cathode active material, a relatively large amount of the residual lithium remained compared to those from other Examples, and the life-span property was relatively degraded.

In Examples 9 and 18 where the sulfur content of the cathode active material exceeded 4,500 ppm based on the total weight of the cathode active material, the resistance of the coating was higher than those from other Examples, and the voltage drop at the initial phase of discharge was relatively increased.

Figure 6:
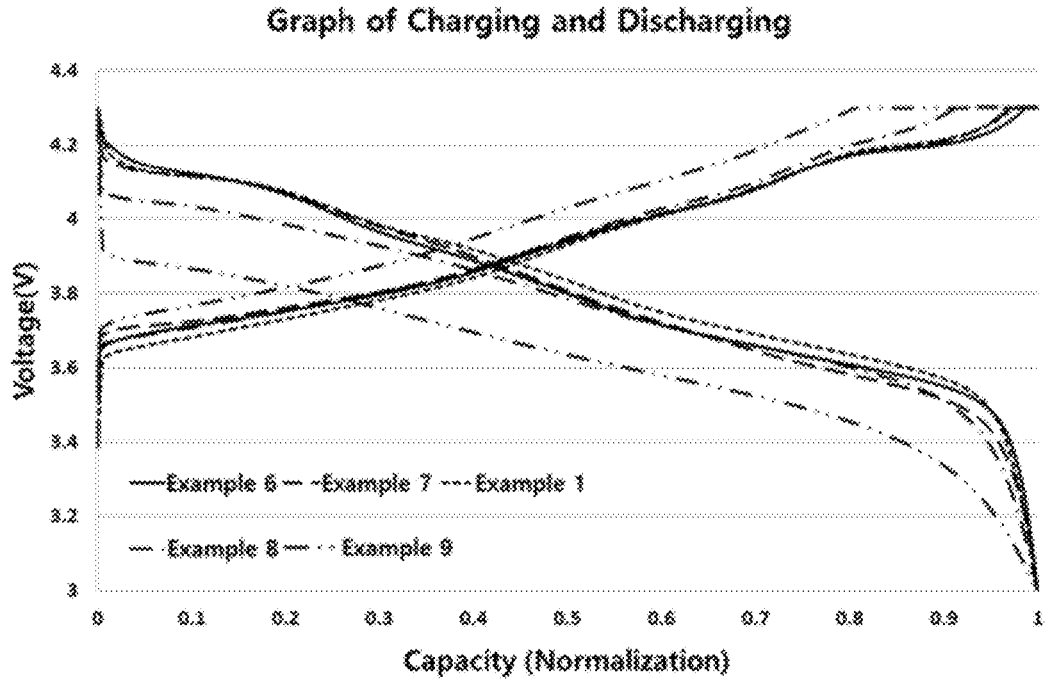
FIG. 6 is a graph showing a voltage drop according to a sulfur content of a cathode active material prepared in accordance with exemplary embodiments.

FIG. 6 is a graph showing a voltage drop according to a sulfur content of a cathode active material prepared in accordance with exemplary embodiments.

Referring to FIG. 6, in Example 9, the voltage drop occurred at the initial stage of discharge due to an excessive amount of the lithium-sulfur compound in the coating.

In Examples 19 and 21 where the calcination temperature was less than 250° C., the residual lithium was not sufficiently removed compared to those in other Examples, and the metal oxide was not converted to the metal hydroxide and partially remained (see XPS binding energy). Accordingly, the capacity retention was lowered compared to those from other Examples.

In Examples 20 and 22 where the calcination temperature exceeded 550° C., the metal hydroxide was partially converted back to the metal oxide at the high temperature. Accordingly, the initial discharge capacity was lowered compared to those from other Examples.

In Comparative Example 2 where only dry-coating with the metal oxide and calcination were performed, a large amount of the residual lithium remained compared to those from Examples, and the metal hydroxide was not present in the coating. As a result, the initial capacity and life-span properties were explicitly deteriorated.

In Comparative Example 3, only the initial wetting method was performed without the dry-coating with the metal oxide. Accordingly, in Comparative Example 3, a large amount of the residual lithium remained compared to those in Examples, and the metal hydroxide was not present in the coating. As a result, the life-span properties were explicitly deteriorated.

In Comparative Examples 4 and 5 where only pure water was mixed after the dry-coating, the metal hydroxide was not formed and the life-span and capacity properties were lowered compared to those from Examples.

In Comparative Example 6 where the metal hydroxide was used instead of the metal oxide for the dry-coating and the calcination was performed, the metal hydroxide was easily converted to the metal oxide even at a relatively low temperature, and the residual lithium was not sufficiently removed. Accordingly, in Comparative Example 6, the life-span and capacity properties were lowered compared to those from Examples.

What is claimed is:

1. A cathode active material for a lithium secondary battery, comprising:

lithium-transition metal composite oxide particles; and a coating formed on each of the lithium-transition metal composite oxide particles, the coating comprising a lithium-sulfur compound and a metal hydroxide, wherein the lithium-sulfur compound includes at least one selected from the group consisting of lithium sulfate ($Li_2SO_4$), lithium sulfate monohydrate ($Li_2SO_4·H_2O$), lithium ammonium sulfate ($Li(NH_4)SO_4$), lithium hydroxylammonium sulfate ($Li(NH_3)(OH)SO_4$), lithium fluorosulfate ($LiSO_3F$), lithium hydrogen sulfate ($LiHSO_4$) and lithium sulfide ($Li_2S$), and wherein a content of the metal hydroxide is in a range from 0.1 mol % to 0.5 mol % based on a total number of moles of the lithium-transition metal composite oxide particles.

2. The cathode active material for a lithium secondary battery of claim 1, wherein a binding energy measured through an X-ray Photoelectron Spectroscopy (XPS) of the metal hydroxide is greater than a binding energy measured through the XPS of an oxide of the metal included in the metal hydroxide by at least 0.4 V.

3. The cathode active material for a lithium secondary battery of claim 1, wherein the metal hydroxide includes at least one selected from the group consisting of LiOH, $Al(OH)_3$, $Ti(OH)_2$, $Zr(OH)_2$, $Sr(OH)_2$, $Ba(OH)_2$, $W(OH)_6$, $Mg(OH)_2$, $Ta(OH)_5$ and $Nb(OH)_5$.

4. The cathode active material for a lithium secondary battery of claim 1, wherein each of the lithium-transition metal composite oxide particles comprises a plurality of primary particles therein, and the lithium-sulfur compound is present on an outer surface of the lithium-transition metal composite oxide particle and between the primary particles.

5. The cathode active material for a lithium secondary battery of claim 4, wherein an amount of the metal hydroxide present on the outer surface of the lithium-transition metal composite oxide particle is greater than an amount of the metal hydroxide present between the primary particles.

6. The cathode active material for a lithium secondary battery of claim 1, wherein a sulfur content in the cathode active material measured through a CS (Carbon-Sulfur) analyzer is in a range from 1,500 ppm to 4,500 ppm based on a total weight of the cathode active material.

7. The cathode active material for a lithium secondary battery of claim 1, wherein the lithium-sulfur compound has a monoclinic crystal structure.

8. A method for manufacturing a cathode active material for a lithium secondary battery, comprising:

mixing lithium-transition metal composite oxide particles and a metal oxide to form a pre-coating on a surface of each of the lithium-transition metal composite oxide particles;

mixing the lithium-transition metal composite oxide particles having the pre-coating thereon and an aqueous solution of a sulfur-containing compound to form a mixture; and performing a calcination of the mixture to form a coating that comprises a lithium-sulfur compound and a metal hydroxide on the surface of the lithium-transition metal composite oxide particles, wherein the lithium-sulfur compound includes at least one selected from the group consisting of lithium sulfate ($Li_2SO_4$), lithium sulfate monohydrate ($Li_2SO_4·H_2O$), lithium ammonium sulfate ($Li(NH_4) SO_4$), lithium hydroxylammonium sulfate ($Li(NH_3)(OH) SO_4$), lithium fluorosulfate ($LiSO_3F$), lithium hydrogen sulfate ($LiHSO_4$) and lithium sulfide ($Li_2S$).

9. The method of claim 8, wherein forming the pre-coating is performed by dry-mixing of the lithium-transition metal composite oxide particles and the metal oxide.

10. The method according to claim 8, wherein the metal oxide includes at least one selected from the group consisting of $Al_2O_3$, $TiO_2$, $Ti_2O_3$, $ZrO_2$, $B_2O_3$, $SrO_2$, $SrAl_2O_4$, $SrTiO_3$, $SrWO_4$, $BaO$, $WO_3$, $(NH_4)_{10}H_2(W_2O_7)_6$, $MgO$, $Ta_2O_5$, $Nb_2O_5$, $MoO_3$, $H_4[W_{12}SiO_{40}]$, $H_4SiO_4·12MoO_3$ and $(NH_4)_2MoO_4$.

11. The method of claim 8, wherein the sulfur-containing compound includes a sulfonyl-based compound, and a weight of a solvent in the aqueous solution is in a range from 2 wt % to 20 wt % based on a total weight of the lithium-transition metal composite oxide particles.

12. The method of claim 8, wherein the calcination is performed at a temperature in a range from 250° C. to 550° C.

13. The method of claim 8, wherein the lithium-transition metal composite oxide particles are mixed with the aqueous solution without a water-washing treatment.

14. A lithium secondary battery, comprising:

a cathode comprising a cathode active material layer, the cathode active material layer comprising the cathode active material for a lithium secondary battery of claim 1; and an anode facing the cathode.

* * * * *